(12) United States Patent
Rinehart

(10) Patent No.: US 6,398,260 B1
(45) Date of Patent: *Jun. 4, 2002

(54) SIDE RAIL FOR A VEHICLE FRAME ASSEMBLY

(75) Inventor: Ronald A. Rinehart, Stevens, PA (US)

(73) Assignee: Dana Corporation, Toledo, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/966,517

(22) Filed: Nov. 10, 1997

(51) Int. Cl.[7] ............................................. B62D 21/00
(52) U.S. Cl. ...................................... 280/781; 296/204
(58) Field of Search ............................... 280/781, 785, 280/786, 800; 29/897.2; 296/204; 52/720.1, 739.1, 733.2, 735.2; 428/595, 598

(56) References Cited

U.S. PATENT DOCUMENTS

| | | | |
|---|---|---|---|
| 813,175 A | | 2/1906 | Schaaf et al. |
| 991,603 A | | 5/1911 | Brooks |
| 1,499,986 A | * | 7/1924 | Kirsch ........................ 428/595 |
| 1,848,895 A | * | 3/1932 | MacPherson ............... 280/800 |
| 2,127,618 A | | 8/1938 | Reimenschneider |
| 3,094,197 A | | 6/1963 | Attwood |
| 3,188,110 A | * | 6/1965 | Wessells, III ............... 280/781 |
| 3,698,224 A | | 10/1972 | Saytes |
| 4,455,806 A | | 6/1984 | Rice |
| 5,114,183 A | * | 5/1992 | Haluda et al. .............. 280/781 |
| 5,308,115 A | * | 5/1994 | Ruehl et al. ................ 280/785 |
| 5,634,663 A | | 6/1997 | Krupp et al. |

* cited by examiner

Primary Examiner—Paul N. Dickson
Assistant Examiner—Faye M. Fleming
(74) Attorney, Agent, or Firm—MacMillan, Sobanski & Todd, LLC (57) ABSTRACT

A side rail for a vehicle frame having a generally open C-shaped cross section defined by a vertically extending web, upper and lower flanges extending from the edges of the web, and upper and lower lips extending from the edge of the upper and lower flanges, respectively. The upper lip extends from the edge of the upper flange and is folded such that a portion of the upper lip is parallel to and abuts an inwardly facing surface of the upper flange. Similarly, the lower lip extends from the edge of the lower flange and is folded such that a portion of the lower lip is parallel to and abuts an inwardly facing surface of the lower flange. The horizontal positioning of the upper and lower lips provide for an increase in the structural strength of the side rail, while permitting a cross member to be positioned between and adjacent to both the upper and lower lips. The cross member can then be attached to the side rail by riveting the cross member to the upper and lower flanges. The upper and lower lips provide for a double gauge thickness of the sheet used to form the side rail in the riveted region where the cross member is attached to the side rail. The side rail can be formed with the upper and lower lips extending along the entire length of the side rail, or with a plurality of cooperating upper and lower lip segments. In another embodiment, the lips have vertically extending portions which abut the inwardly facing surface of the web.

21 Claims, 5 Drawing Sheets

SIDE RAIL FOR A VEHICLE FRAME ASSEMBLY

BACKGROUND OF THE INVENTION

This invention relates in general to body and frame assemblies for vehicles. More specifically, this invention relates to an improved structure for an open channel side rail section for use in such a vehicular body and frame assembly.

Many land vehicles in common use, such as automobiles, vans, and tucks, include a body and frame assembly that is supported upon a plurality of ground-engaging wheels by a resilient suspension system, The structures of known body and frame assemblies can be divided into two general categories, namely, separate and unitized. In a typical separate body and frame assembly, the structural components of the body portion and the frame portion are separate and independent from one another When assembled, the frame portion of the assembly is resiliently supported upon the vehicle wheels by the suspension system and serves as a platform upon which the body portion of the assembly and other components of the vehicle can be mounted. Separate body and frame assemblies of this general type are found in most older vehicles, but remain in common use today for many relatively large or specialized use modern vehicles, such as large vans, sport utility vehicles, and trucks. In a typical unitized body and frame assembly, the structural components of the body portion and the frame portion are combined into an integral unit that is resiliently supported upon the vehicle wheels by the suspension system. Unitized body and frame assemblies of this general type are found in many relatively small modern vehicles, such as automobiles and minivans.

One well known example of a separate type of vehicular body and frame assembly is commonly referred to as a ladder frame assembly. A ladder frame assembly includes a pair of longitudinally extending side rails that are joined together by a plurality of transversely extending cross members. The cross members connect the two side rails together and provide desirable lateral, vertical, and torsional stiffness to the ladder frame assembly. The cross members can also be used to provide support for various components of the vehicle. Depending upon the overall length of the vehicle and other factors, the side rails of a conventional ladder frame assembly may be formed either from a single, relatively long structural member or from a plurality of individual, relatively short structural sections that are secured together. For example, in vehicles having a relatively short overall length, it is known to form each of the side rails from a single integral structural member that extends the entire length of the vehicle body and frame assembly. In vehicles having a relatively long overall length, it is known to form each of the side rails from two or more individual structural sections that are secured together, such as by welding, to provide a unitary structural member that extends the entire length of the vehicle body and frame assembly.

Traditionally, the side rails of known vehicle body and frame assemblies have been formed from open channel structural members, i.e., structural members that have a non-continuous cross sectional shape. In one known open channel structure, the side rail includes a vertically extending web portion having upper and lower flange portions extending horizontally therefrom. This structure is referred to as an open C-shaped structural member. It is relatively easy to secure cross members to side rails formed from open C-shaped structural members because flange portions of the cross members can lay flat against corresponding portions of the upper and lower flange portions. Thus, the flange portions of the cross member can be easily secured to the flange portions of the side rail in any conventional manner, such as by welding, rivets, bolts, and the like.

In another known open channel structure, the side rail includes a vertically extending web portion having upper and lower flange portions extending horizontally therefrom as described above, but further includes upper and lower lip portions that extend vertically inwardly from the edges of the upper and lower flange portions. This structure is referred to as a closed C-shaped structural member. The torsional stiffness of closed C-shaped structural members is desirably higher than the torsional stiffness of open C-shaped structural members. However, it has been found more difficult to secure cross members to closed C-shaped structural members than to open C-shaped structural members. This is because the inwardly extending lip portions of the closed C-shaped structural members prevent the flange portions of the cross member from laying flat against corresponding portions of the upper and lower flange portions. To address this, it is known to form one or more notches in the lip portions to permit the flange portions of the cross member to extend therethrough to the flange portions of the side rail. However, the formation of such notches weakens the side rail and reduces the torsional stiffness thereof. Thus, it would be desirable to provide an improved structure for an open channel side rail section for use in a vehicular body and frame assembly that facilitates the direct connection of a cross member to the upper and lower flanges thereof, yet which maintains a desired torsional stiffness.

SUMMARY OF THE INVENTION

This invention relates to an improved structure for an open channel side rail section for use in a vehicular body and frame assembly that facilitates the direct connection of a cross member to the upper and lower flanges thereof, yet which maintains a desired torsional stiffness. The side rail has a generally open C-shaped cross section defined by a vertically extending web, upper and lower flanges extending from the edges of the web, and upper and lower lips extending from the edge of the upper and lower flanges, respectively. The upper lip extends from the edge of the upper flange and is folded such that a portion of the upper lip is parallel to and abuts an inwardly facing surface of the upper flange. Similarly, the lower lip extends from the edge of the lower flange and is folded such that a portion of the lower lip is parallel to and abuts an inwardly facing surface of the lower flange. The horizontal positioning of the upper and lower lips provide for an increase in the structural strength of the side rail, while permitting a cross member to be positioned between and adjacent to both the upper and lower lips. The cross member can then be attached to the side rail by riveting the cross member to the upper and lower flanges. The upper and lower lips provide for a double gauge thickness of the sheet used to form the side rail in the riveted region where the cross member is attached to the side rail. The side rail can be formed with the upper and lower lips extending along the entire length of the side rail, or with a plurality of cooperating upper and lower lip segments. In another embodiment, the lips have vertically extending portions which abut the inwardly facing surface of the web. The free edges of the vertically extending portions can be formed so as to be adjacent to each other and connected together, such as by a weld.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figures 1, 2:
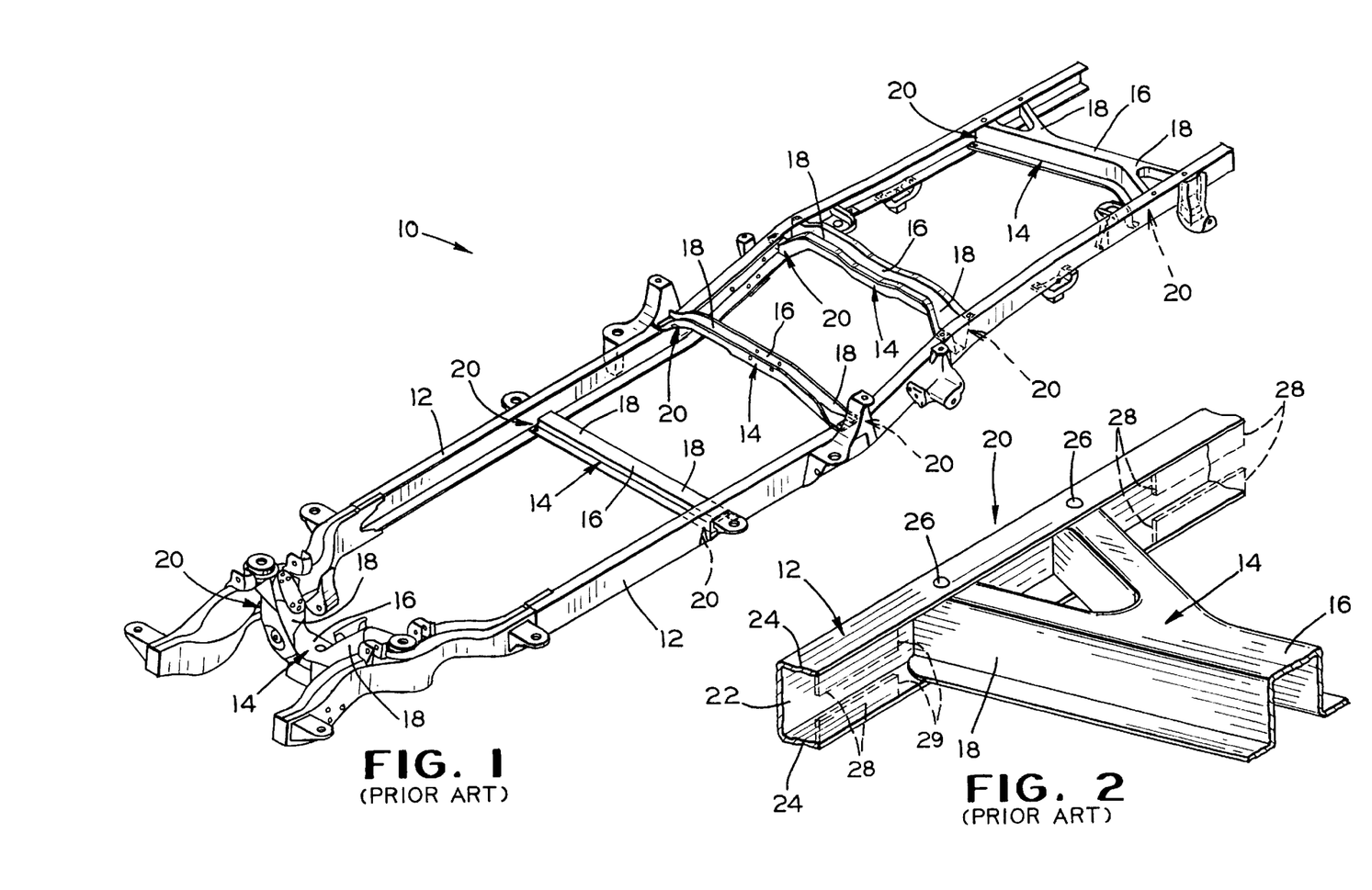
FIG. 1 is a perspective view of a prior art vehicle frame including a pair of side rails connected together by a plurality of cross members.
FIG. 2 is an enlarged perspective view of a joint between one of the side rails and one of the cross members of the prior art vehicle frame illustrated in FIG. 1.

Referring now to the drawings, there is illustrated in FIG. 1 a prior art vehicle frame, indicated generally at 10. Throughout this discussion, it should be noted that terms of orientation, such as horizontal, vertical, inward, outward, and the like are used to facilitate the explanation of the structure of this invention and are not intended to be limiting in nature. The vehicle frame 10 includes two side rails 12 which are spaced apart and extend generally parallel with one another. Each side rail 12 is generally in the shape of an elongated beam. A plurality of cross members 14 extend between the side rails 12 to connect them together. Each cross member 14 is generally in the shape of a beam which is relatively shorter than a side rail 12. The cross members 14 are spaced apart and extend generally perpendicular to the side rails 12 and generally parallel with one another. Each cross member 14 includes a center portion 16 and a pair of end portions 18. Each end portion 18 of the cross member 14 is connected to a side rail 12 at a vehicle fame joint, illustrated generally at 20.

FIG. 2 illustrates in detail one of the joints 20 between a prior art side rail 12 and a cross member 14 of the vehicle frame 10 of FIG. 1. As shown therein, the side rail 12 is formed having an open C-shaped cross section including a vertically extending web 22 and upper and lower horizontally extending flanges 24. The illustrated end portion 18 of the cross member 14 is split into two legs, each of which is connected to the side rail 12 at the joint 20. The legs of the end portion 18 of the cross member 14 have flanges that extend adjacent to and lay flat against both the upper and lower horizontally extending flanges 24 of the side rail 12. This allows the cross member 14 to be connected to both flanges, such as by rivets 26 (shown only in the upper flange 24).

FIG. 2 also illustrates an alternative structure for the joint 20, wherein the side rail 12 is formed having a closed C-shaped cross-section including a vertically extending web 22 and upper and lower horizontally extending flanges 24 as described above, and further including upper and lower vertically lips, indicated in dotted lines at 28. The lips 29 extending inwardly from the respective edges of the flange portions 24 of the side rail. Each of the lips 28 has a notch 29 formed therein in the region of the joint 20. The notches 29 permit the cross member 14 to extend therethrough such that the flange portions of the cross member 14 lay flat against the upper and lower horizontally extending flanges 24 of the side rail 12 for securement thereto, as described above.

Figures 3, 4:
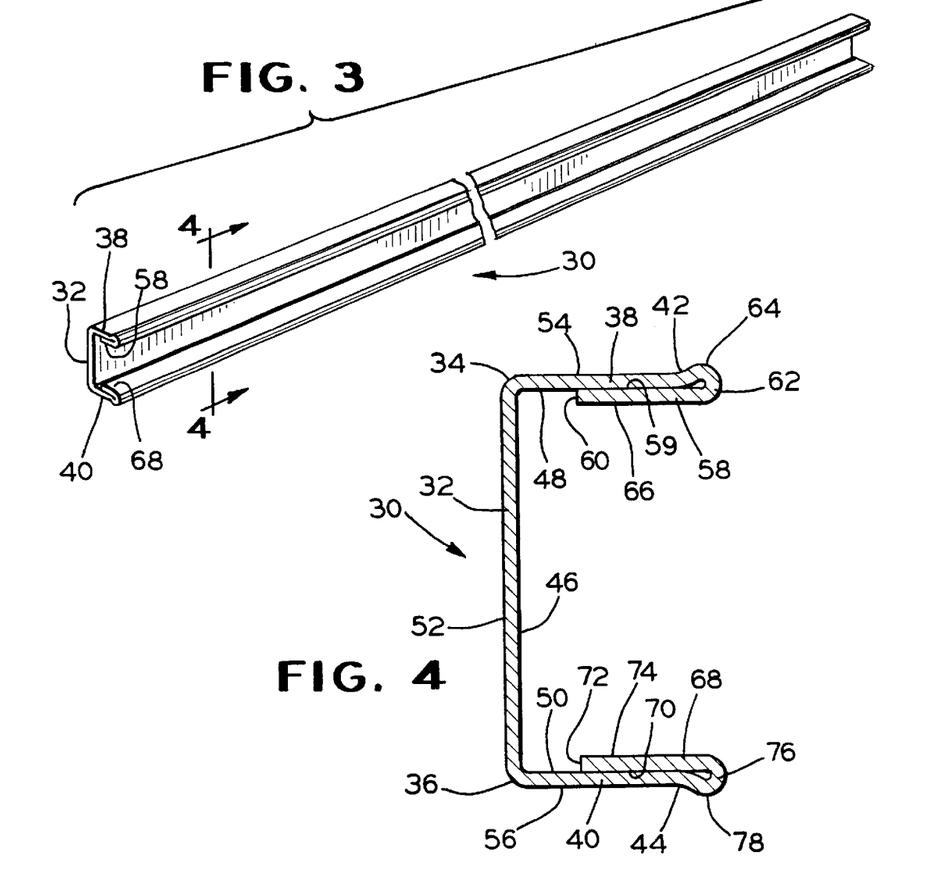
FIG. 3 is a perspective view of a first embodiment of a side rail in accordance with this invention.
FIG. 4 is a sectional elevational view of the first embodiment of the side rail taken along line 4—4 of FIG. 3.
Figure 5:
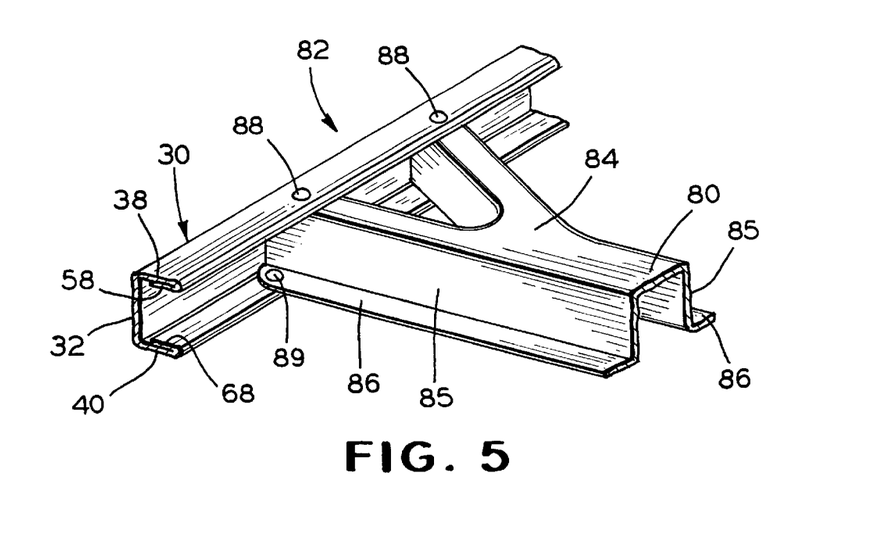
FIG. 5 is an enlarged perspective view of a joint between the side rail illustrated in FIGS. 3 and 4 and a cross member.

Referring now to FIGS. 3, 4, and 5, there is illustrated a first embodiment of a side rail 30 in accordance with this invention. The illustrated side rail 30 can be substituted for the side rail 12 of the vehicle frame 10 illustrated in FIG. 1. As best shown in FIGS. 3 and 4, the side rail 30 has a generally open C-shaped cross sectional shape, including a vertically extending web 32 defining an upper longitudinally extending edge 34 and a lower longitudinally extending edge 36. An upper longitudinally extending flange 38 extends horizontally from the upper edge 34 of the web 32. Similarly, a lower longitudinally extending flange 40 extends horizontally from the lower edge 36 of the web 32. The upper and lower flanges 38 and 40 extend generally perpendicular to the web 32 and generally parallel with one another. The upper flange 38 terminates at an upper longitudinally extending edge 42, while the lower flange 38 terminates at a lower longitudinally extending edge 44. The web 32, the upper flange 38, and the lower flange 40 have respective inwardly facing surfaces 46, 48, and 50. The web 32, the upper flange 38, and the lower flange 40 also have respective outwardly facing surfaces 52, 54, and 56.

The side rail 30 further includes an upper longitudinally extending lip 58 that extends from the upper edge 42 of the upper flange 38 and is folded over such that an outwardly facing surface 59 thereof abuts against the inwardly facing surface 48 of the upper flange 38. The upper lip 58 extends generally parallel to the upper flange 38 and terminates at a longitudinally extending edge 60. In the illustrated embodiment, the majority of the upper lip 58 abuts the inwardly facing surface 48 of the upper flange 38. The remaining portion of the upper lip 52 forms a curved folded portion 62. As shown in FIG. 4, the folded portion 62 has a slight radial bulge 64 which extends vertically beyond the outwardly facing surface 54 of the upper flange 38. The radial bulge 64 is typically formed as a natural consequence from a roll forming process used to form the side rail 30. If desired, the side rail 30 can be formed so that the radial bulge 64 extends vertically below an inwardly facing surface 66 of the upper lip 58. The folded portion 62 can also be formed without the radial bulge 64 so that the folded portion is vertically flush with the outwardly facing surface 54 of the upper flange 38 and the inwardly facing surface 66 of the upper lip 58.

The side rail 30 further includes a lower longitudinally extending lip 68 that is similar in structure to the upper lip 58. The lower lip 68 extends from the lower edge 44 of the lower flange 40 and is folded over such that an outwardly facing surface 70 abuts the inwardly facing surface 50 of the lower flange 40. The lower lip 68 extends generally parallel to the lower flange 40 and terminates at an edge 72. Similar to the upper lip 58, the lower lip 68 includes an inwardly facing surface 74 and a folded portion 76 having a radial bulge 78. Of course, the folded portion 76 can be formed without the radial bulge 78.

The side rail 30 can be formed from any suitable manufacturing process, such as roll forming. To roll form a side rail 30, a elongated single blank or sheet of material, such as steel, is first provided. The sheet is then fed longitudinally into a series of rollers. The rollers bend or fold the sheet to form the web 32, the upper and lower flanges 38 and 40, and the upper and lower lips 58 and 68, as described above.

As shown in FIG. 5, the side rail 30 can be connected to a cross member 80 to form a joint, indicated generally at 82. The illustrated cross member 80 has a hat-shaped cross-section defined by a horizontal upper web portion 84, a pair of side portions 95 extending vertically downwardly from edges of the upper web portion 84, and a pair of lower flange portions 86 extending horizontally outwardly from the side portions 85. The end of the cross member 80 may be split into two legs if desired. Regardless, a portion of the upper web portion 84 extends adjacent to and lays flat against the inwardly facing surface 66 of the upper lip 58. Any conventional securing structure, such as rivets 88, can be used to secure the upper web portion 84 to the upper lip 58 and the upper flange 19. The rivets 88 extend through respective apertures (not shown) formed through the upper flange 38 and the upper lip 58. Any suitable number of rivets 88 may be used. Similarly, portions of the lower flange portions 86 extend adjacent to and lay flat against the inwardly facing surface 74 of the lower lip 68. Any conventional securing structure, such as rivets 89, can be used to secure the lower flange portions 86 to the lower lip 68 and the lower flange 40. Although the illustrated cross member 80 is hat-shaped in cross section, it will be appreciated that the cross member 80 may be formed having any desired cross sectional shape, including (but not limited to) open C-shaped, closed C-shaped, I-shaped and the like.

The orientation of the upper and lower lips 58 and 68 provides for an increase in the structural strength of the side rail 30 compared to a side rail having an open C-shaped cross section without such lips 58 and 68. Furthermore, the upper and lower lips 58 and 68, in cooperation with the abutting upper and lower flanges 38 and 48, provide for a double thickness of material in the regions of the side rail 30 where the rivets 88 or other securing structures are provided. This double thickness of material provides for increased shear strength in that region, which is likely to be subjected to high shear stress during operation.

Figures 6, 7:
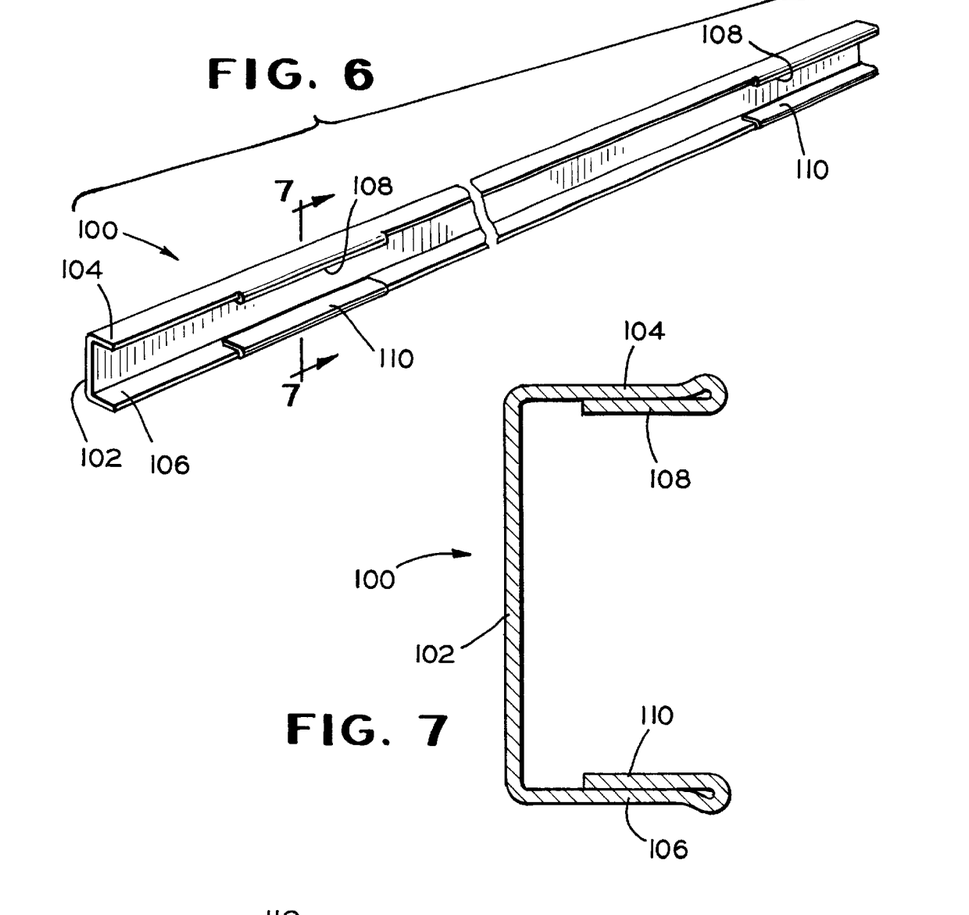
FIG. 6 is a perspective view of a second embodiment of a side rail in accordance with this invention.
FIG. 7 is a sectional elevational view of the second embodiment of the side rail taken along line 7—7 of FIG. 6.
Figure 8:
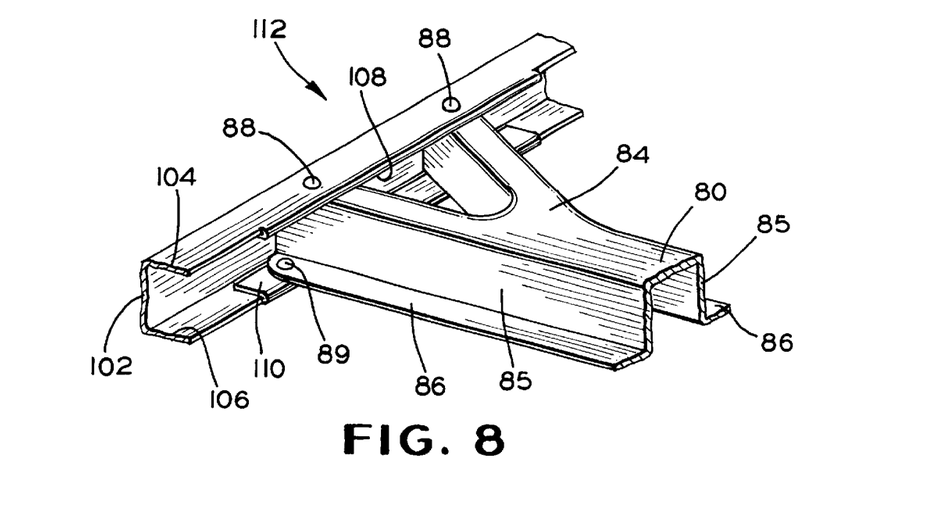
FIG. 8 is an enlarged perspective view of a joint between the side rail illustrated in FIGS. 5 and 6 and a cross member.

Referring now to FIGS. 6 through 8, there is illustrated a second embodiment of a side rail 100 in accordance with the present invention. The side rail 100 is similar to the side rail 30 illustrated in FIGS. 3 through 5 and includes a web 102, an upper flange 104, and a lower flange 106. However, the side rail 100 does not have continuous upper and lower lips longitudinally extending along the entire length of the side rail 100. Instead, the side rail 100 has a plurality of upper lip segments 108 and a plurality of corresponding lower lip segments 110. The lip segments 108 and 110 are discontinuous along the longitudinal length of the side rail 100 and are preferably provided in pairs. The side rail 100 can be formed with any suitable number of upper and lower lip segments 108 and 110. Preferably, cooperating upper and lower lip segments 108 and 110 are positioned at locations of the side rail 100 where localized reinforcement is desirable, such as at joints 112 wherein a cross member 80, similar to the cross member 80 described above, is attached thereto.

As shown in FIG. 8, the cross member 80 is attached to the side rail 100 by rivets 88 and 89 (or other connecting structures) that extend through the upper and lower lip segments 108 and 110 and the corresponding upper and lower flanges 104 and 106. The upper and lower lip segments 108 and 110 provide increased strength at the joint 112, as described above. However, because the lip segments 108 and 110 are discontinuous throughout the length of the side rail 100, the overall weight of the side rail 100 is less than the weight of the side rail 30 described above.

Figures 9, 10:
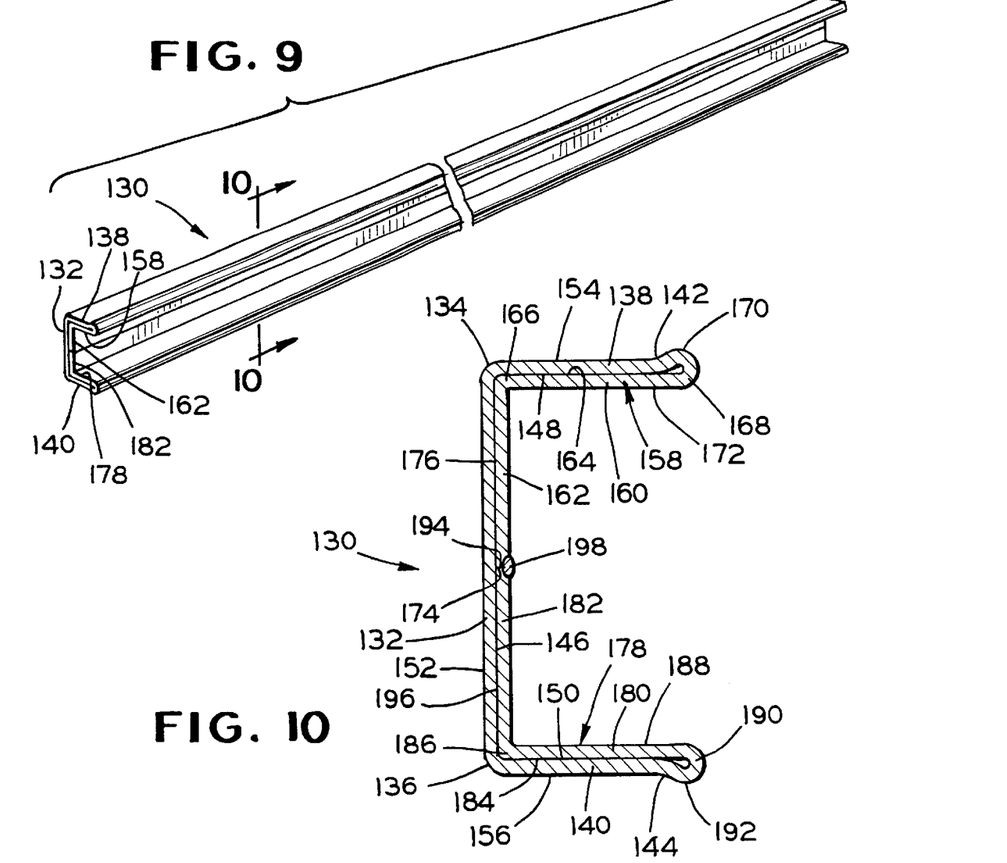
FIG. 9 is a perspective view of a third embodiment of a side rail in accordance with this invention.
FIG. 10 is a sectional elevational view of the third embodiment of the side rail taken along line 10—10 of FIG. 9.
Figure 11:
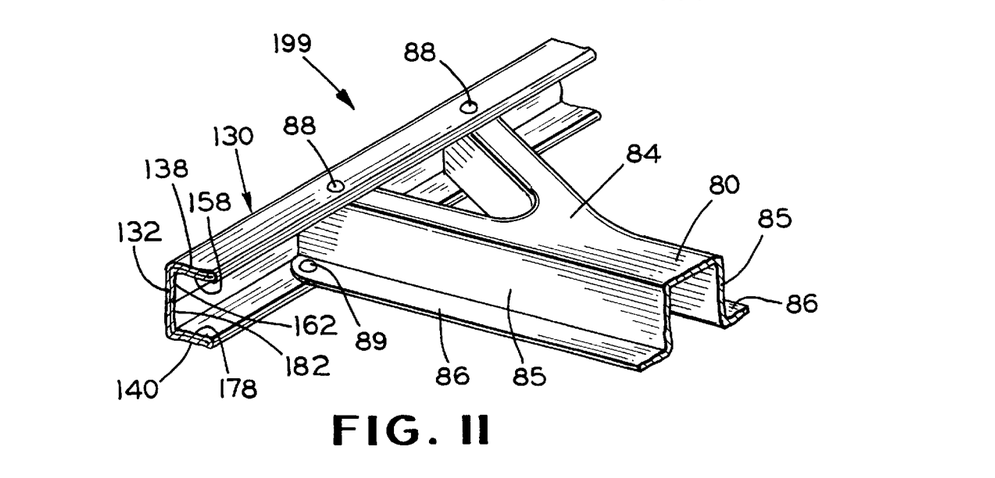
FIG. 11 is an enlarged perspective view of a joint between the side rail illustrated in FIGS. 9 and 10 and a cross member.

Referring now to FIGS. 9 through 11, there is illustrated a third embodiment of a side rail 130 in accordance with the present invention. As best shown in FIG. 10, the side rail 110 has a generally open C-shaped cross sectional shape defined by a vertically extending web 132 having an upper longitudinally extending edge 134 and a lower longitudinally extending edge 136. An upper longitudinally extending flange 138 extends horizontally from the upper edge 134 of the web 132. Similarly, a lower longitudinally extending flange 140 extends horizontally from the lower edge 136 of the web 132. The upper and lower flanges 138 and 140 extend generally perpendicular to the web 132 and generally parallel with one another. The upper flange 138 terminates at an upper edge 142, while the lower flange 138 terminates at a lower edge 144. The web 132, the upper flange 138, and the lower flange 140 have respective inwardly facing surfaces 146, 148, and 150 and respective outwardly facing surfaces 152, 154, and 156.

The side rail 130 further includes an upper longitudinally extending lip 158 having a horizontal portion 160 and a vertical portion 162. The horizontal portion 160 extends horizontally from the upper edge 142 of the upper flange 138 and is folded over such that an outwardly facing surface 164 of the horizontal portion 160 abuts the inwardly facing surface 148 of the upper flange 138. The horizontal portion 160 extends generally parallel to the upper flange 138 and terminates at an upper edge 166. In the illustrated embodiment, the majority portion of the horizontal portion 160 of the upper lip 158 abuts the surface 148 of the upper flange 138. The remaining portion of the horizontal portion 160 of the upper lip 152 forms a curved folded portion 168. As shown in FIG. 10, the folded portion 168 has a slight radial bulge 170 that extends vertically beyond the outwardly facing surface 154 of the upper flange 138. The radial bulge 170 is typically formed as a natural consequence from a roll forming process. If desired, the side rail 130 can be formed so that the radial bulge 170 extends vertically below an inwardly facing surface 172 of the horizontal portion 160. Of course, the folded portion 168 can be formed without the radial bulge 170 so that the folded portion 168 is vertically flush with the outwardly facing surface 154 of the upper flange 119 and the inwardly facing surface 172 of the horizontal portion 160.

The vertical portion 162 of the upper lip 158 extends vertically downward from the upper edge 166 of the horizontal portion 160 and terminates at an edge 174. The vertical portion 162 extends generally parallel to the web 132 and has an outwardly facing surface 176 which abuts the inwardly facing surface 146 of the web 132. The vertical portion 162 can be of any height such that the edge 174 is positioned anywhere along the web 132. In the illustrated embodiment of the vertical portion 162 shown in FIGS. 9 through 11, the edge 174 is positioned generally at the midpoint of the height of the web 132. The edge 174 can also be connected to another structural member of the side rail 130, as will be described in detail below.

The side rail 130 further includes a lower lip 178 that is similar in structure to the upper lip 158. The lower lip 178 has a horizontal portion 180 and a vertical portion 182. The horizontal portion 180 extends horizontally from the lower edge 144 of the lower flange 140 and is folded over such that the an outwardly facing surface 184 of the horizontal portion 180 abuts the inwardly facing surface 150 of the lower flange 140. The horizontal portion 180 extends generally parallel to the lower flange 140 and terminates at a lower edge 186. Similar to the horizontal portion 160 of the upper lip 158, the horizontal portion 180 of the lower lip 178 includes an inwardly facing surface 188 and a folded portion 190 having a radial bulge 192. Of course, the folded portion 190 can be formed without the radial bulge 192. The vertical portion 182 of the lower lip 178 extends vertically upward from the lower edge 186 of the horizontal portion 180 and terminates at an edge 194. The vertical portion 182 extends generally parallel to the web 132 and has an outwardly facing surface 196 that abuts the inwardly facing surface 146 of the web 132.

The vertical portion 182 can be of any height such that the edge 194 is positioned anywhere along the web 132. In the illustrated embodiment of the vertical portion 182 shown in FIGS. 9 through 11, the edge 194 is positioned generally at the midpoint of the height of the web 132 and is adjacent the edge 174 of the vertical portion 162 of the upper lip 158. If desired, the edges 174 and 194 can be joined together, such as by a weld 198. If desired, the weld 198 or other securing structure can also be used to secure the edges 174 and 194 to the web 132.

As shown in FIG. 11, the cross member 80 can be attached to the side rail 130 to form a joint 199. The cross member 80 can be attached to the side rail 130 by rivets 99 in a similar manner as the side rails 30 and 100 illustrated in FIGS. 3 through 5 and FIGS. 6 through 8, respectively. The upper and lower lips 158 and 178 provide for a double gauge thickness for substantially the entire length of the side rail 130. Of course, the side rail 130 can be formed with upper and lower lip segments, similar to the side rail 100, to provide for reinforcement areas surrounding such a cross member joint 199.

Figure 12:
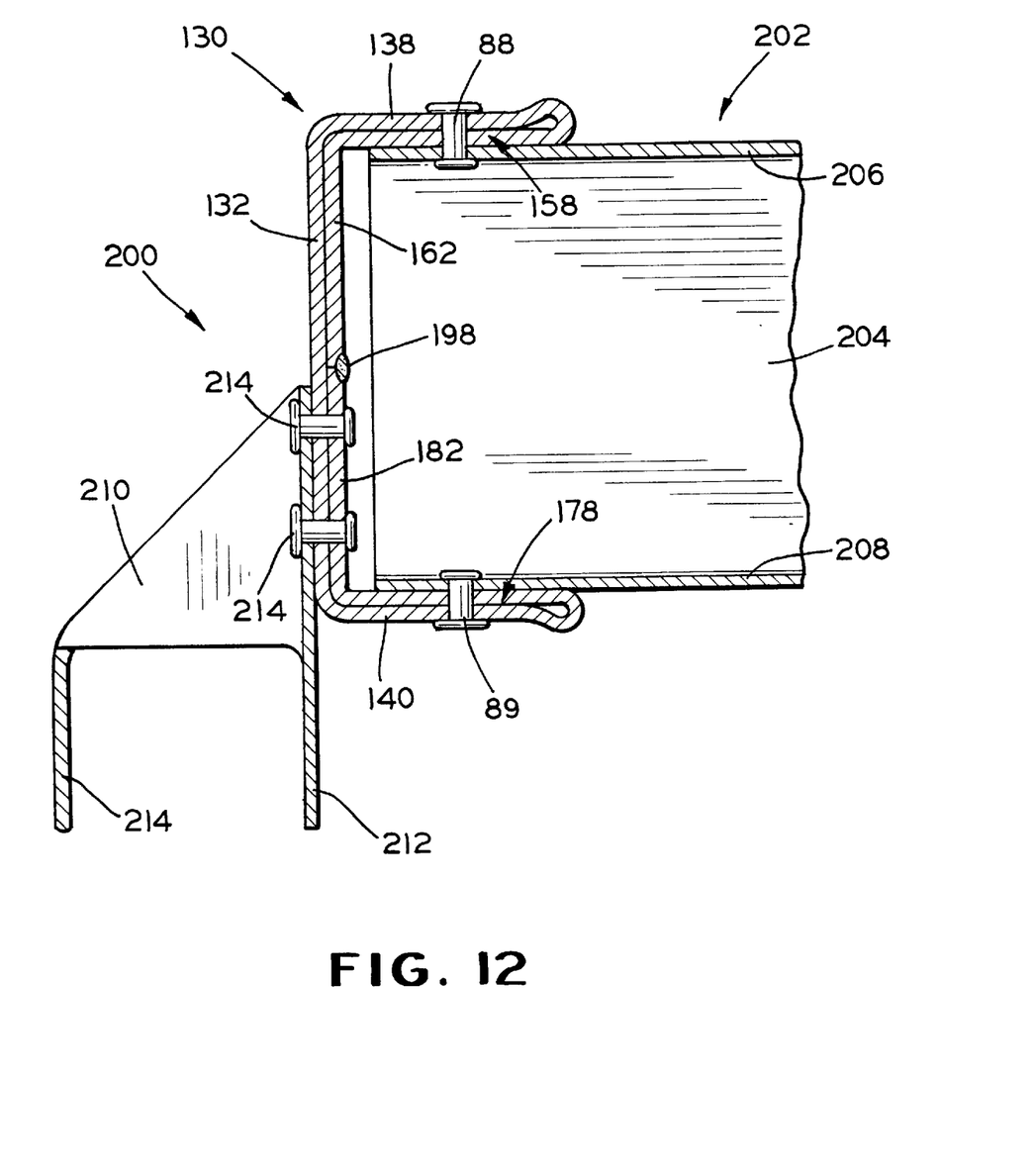
FIG. 12 is a sectional elevational view of an alternative joint structure utilizing the side rail illustrated in FIG. 9 through FIG. 11.

Referring now to FIG. 12, there is illustrated an alternative joint structure 200 utilizing the side rail 130 illustrated in FIGS. 9 through 11. For the sake of simplicity, the hat-shaped cross member 80 has been replaced by a simple open C-shaped cross member 202 including a vertically extending web 204 having upper and lower horizontally extending flanges 206 and 208. As previously described the rivets 88 extend through the upper longitudinally extending flange 138 and the upper lip 158 of the side rail 130 and through the upper flange 206 of the cross member 202, while the rivets 89 extend through the lower longitudinally extending flange 140 and the lower lip 178 of the side rail 130 and through the lower longitudinally extending flange 208 of the cross member 202. Additionally, a bracket 210 is provided for securing a component to the exterior of the side rail 130. For example, the bracket 210 can be a spring bracket having a pair of depending bracket arms 212 and 214 for securing one end of a leaf spring (not shown) to the side rail 130.

A pair of rivets 214 or other conventional securing structures are provided for securing the bracket 210 to the side rail 130. To accomplish this, the rivets 214 extend through respective apertures formed through the arm 212 of the bracket 210, the web 132 of the side rail 130, and the vertical portion 182 of the lower lip 178. Thus, the rivets 214 extend through a double thickness of material in the regions of the side rail 130 where the rivets 214 or other securing structures are provided for securing the bracket 210 to the side rail 130.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle frame assembly comprising:
   a first side rail including a web, first and second flanges extending from said web and having inwardly facing surfaces, and a lip extending from at least one of said first and second flanges and abutting at least one of said inwardly facing surfaces, said web, flanges, and lip being formed from a single piece of material;
   a second side rail;
   a first cross member having first and second end portions, said first end portion of said first cross member being engaged with said lip and secured to said first side rail, said second end portion of said first cross member being secured to said second side rail; and
   a second cross member having first and second end portions, said first end portion of said second cross member being secured to said first side rail, said second end portion of said second cross member being secured to said second side rail to form said vehicle frame assembly.

2. The vehicle frame assembly defined in claim 1 wherein said first end portion of said second cross member is engaged with said lip and secured to said first side rail.

3. The vehicle frame assembly defined in claim 1 wherein said second side rail includes a web, first and second flanges extending from said web and having inwardly facing surfaces, and a lip extending from at least one of said first and second flanges and abutting at least one of said inwardly facing surfaces, said web, flanges, and lip being formed from a single piece of material, and wherein said second end portion of said first cross member is engaged with said lip and secured to said second side rail.

4. The vehicle frame assembly defined in claim 3 wherein said first end portion of said second cross member is engaged with said lip and secured to said first side rail.

5. The vehicle frame assembly defined in claim 4 wherein said second end portion of said second cross member is engaged with said lip and secured to said second side rail.

6. The vehicle frame assembly defined in claim 3 wherein said lip is a first lip that extends from said first flange and abuts said inwardly facing surface of said first flange, and further including a second lip that extends from said second flange and abut said inwardly facing surface of said second flange, said web, flanges, and lips being formed from a single piece of material.

7. The vehicle frame assembly defined in claim 6 wherein said first end portion of said first cross member is engaged with said lips and secured to said first side rail.

8. The vehicle frame assembly defined in claim 7 wherein said first end portion of said second cross member is engaged with said lips and secured to said first side rail.

9. The vehicle frame assembly defined in claim 7 wherein said second side rail includes a web, first and second flanges extending from said web and having inwardly facing surfaces, and first and second lips extending respectively from said first and second flanges and respectively abutting said inwardly facing surfaces, said web, flanges, and lips being formed from a single piece of material, and wherein said second end portion of said first cross member is engaged with said lips and secured to said second side rail.

10. The vehicle frame assembly defined in claim 9 wherein said first end portion of said second cross member is engaged with said lips and secured to said first side rail.

11. The vehicle frame assembly defined in claim 10 wherein said second end portion of said second cross member is engaged with said lips and secured to said second side rail.

12. The vehicle frame assembly defined in claim 3 wherein said lip includes a first portion that abuts said inwardly facing surface and a second portion extending from said first portion that abuts said web.

13. The vehicle frame assembly defined in claim 1 wherein said lip is a first lip that extends from said first flange and includes a first portion that abuts said inwardly facing surface of said first flange and a second portion extending from said first portion that abuts said web, and further including a second lip that extends from said second flange and includes a first portion that abuts said inwardly facing surface of said second flange and a second portion extending from said first portion that abuts said web, said web, flanges, and lips being formed from a single piece of material.

14. The vehicle frame assembly defined in claim 13 wherein said second portions of said first and second lips terminate adjacent one another.

15. The vehicle frame assembly defined in claim 14 wherein said second portions of said first and second lips are secured together.

16. The vehicle frame assembly defined in claim 15 wherein said second portions of said first and second lips are welded together.

17. The vehicle frame assembly defined in claim 1 wherein said lip extends a length that is less than a length defined by said one of said flanges.

18. The vehicle frame assembly defined in claim 1 wherein said lip is a first lip that extends from said first flange and abuts said inwardly facing surface of said first flange, and further including a second lip that extends from said second flange and abut said inwardly facing surface of said second flange, said web, flanges, and lips being formed from a single piece of material, wherein each of said lips extends a length that is less than a length defined by said respective flanges.

19. The vehicle frame assembly defined in claim 1 further including a bracket secured to said web of said first side rail.

20. The vehicle frame assembly defined in claim 19 wherein said lip includes a first portion that abuts said inwardly facing surface and a second portion extending from said first portion that abuts said web, and wherein said bracket is secured to said web and to said lip of said first side rail.

21. The vehicle frame assembly defined in claim 19 wherein said lip is a first lip that extends from said first flange and includes a first portion that abuts said inwardly facing surface of said first flange and a second portion extending from said first portion that abuts said web, and further including a second lip that extends from said second flange and includes a first portion that abuts said inwardly facing surface of said second flange and a second portion extending from said first portion that abuts said web, said web, flanges, and lips being formed from a single piece of material, and wherein said bracket is secured to said web and to said lips of said first side rail.

* * * * *